United States Patent
Alameh et al.

(10) Patent No.: US 9,903,753 B2
(45) Date of Patent: Feb. 27, 2018

(54) PORTABLE ELECTRONIC DEVICE WITH DUAL, DIAGONAL PROXIMITY SENSORS AND MODE SWITCHING FUNCTIONALITY

(71) Applicant: Motorola Mobility LLC, Chicago, IL (US)

(72) Inventors: Rachid M Alameh, Crystal Lake, IL (US); Patrick J Cauwels, South Beloit, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 517 days.

(21) Appl. No.: 14/595,257

(22) Filed: Jan. 13, 2015

(65) Prior Publication Data
US 2016/0202114 A1 Jul. 14, 2016

(51) Int. Cl.
*G08C 19/16* (2006.01)
*G01J 1/02* (2006.01)
(Continued)

(52) U.S. Cl.
CPC ............ *G01J 1/0238* (2013.01); *G01J 1/0233* (2013.01); *G01J 1/4228* (2013.01); *G01J 1/44* (2013.01);
(Continued)

(58) Field of Classification Search
CPC ........ G06F 3/017; G06F 3/121; G06F 3/0304; G06F 3/1221; G06F 3/1229;
(Continued)

(56) References Cited

U.S. PATENT DOCUMENTS 4,882,567 A * 11/1989 Johnson ................. G08B 13/19
340/522
5,499,016 A * 3/1996 Pantus ................. G08B 29/046
250/222.1
(Continued)

FOREIGN PATENT DOCUMENTS

EP 0810512 12/1997
WO 2015/138095 9/2015

OTHER PUBLICATIONS

Rachid M. Alameh, et al,. "Portable Electronic Device with Dual, Diagonal Proximity Sensors and Mode Switching Functionality"; U.S. Appl. No. 14/595,258, filed Jan. 13, 2015, 38 pages.
(Continued)

*Primary Examiner* — John A Tweel, Jr.
*Assistant Examiner* — Adnan Aziz
(74) *Attorney, Agent, or Firm* — Philip H. Burrus, IV

(57) ABSTRACT

An electronic device includes a housing and one or more processors. At least one proximity sensor component is operable with the one or more processors and includes an infrared signal receiver to receive an infrared emission from an object external to the housing. At least one proximity detector component is also operable with the one or more processors and includes a signal emitter and corresponding signal receiver. The one or more processors can actuate the at least one proximity detector component when the at least one proximity sensor component receives the infrared emission from the object.

20 Claims, 11 Drawing Sheets

(51) Int. Cl.
| | |
|---|---|
| *G01J 1/42* | (2006.01) |
| *G01J 1/44* | (2006.01) |
| *G06F 1/32* | (2006.01) |
| *G06F 1/16* | (2006.01) |
| *G06F 3/01* | (2006.01) |
| *G06F 3/03* | (2006.01) |

(52) U.S. Cl.
CPC ......... *G06F 1/1684* (2013.01); *G06F 1/1694* (2013.01); *G06F 1/3231* (2013.01); *G06F 3/017* (2013.01); *G06F 3/0304* (2013.01); *G01J 2001/0257* (2013.01); *Y02B 60/1289* (2013.01)

(58) Field of Classification Search
CPC .......... G06F 3/1285; G06F 1/26; G06F 1/169; G06F 1/1626; G06F 1/1684; G06F 1/1694; G06F 1/3231; G06F 1/3265; G06F 1/3284; G06F 1/3203; G06F 1/3206
See application file for complete search history.

(56) References Cited

U.S. PATENT DOCUMENTS

| | | | | |
|---|---|---|---|---|
| 5,936,524 | A * | 8/1999 | Zhevelev | G01S 7/4004 340/521 |
| 6,239,736 | B1 * | 5/2001 | McDonald | G01S 7/2922 340/554 |
| 7,016,705 | B2 * | 3/2006 | Bahl | G06F 1/3203 455/566 |
| 7,653,919 | B2 * | 1/2010 | Potyrailo | G11B 20/00086 340/572.1 |
| 7,705,730 | B2 * | 4/2010 | Royer | G01S 7/2922 340/506 |
| 8,030,914 | B2 * | 10/2011 | Alameh | G01D 18/006 324/115 |
| 8,519,883 | B2 * | 8/2013 | Drake | F21V 23/0442 340/500 |
| 8,723,957 | B2 * | 5/2014 | Kim | H04N 5/232 340/539.11 |
| 2002/0175815 | A1 * | 11/2002 | Baldwin | G01S 13/04 340/567 |
| 2005/0127298 | A1 * | 6/2005 | DiPoala | G08B 13/191 250/342 |
| 2007/0146127 | A1 * | 6/2007 | Stilp | G08B 1/08 340/531 |
| 2010/0321289 | A1 * | 12/2010 | Kim | G06F 1/1626 345/156 |
| 2012/0098661 | A1 * | 4/2012 | Stromberg | G08B 13/189 340/541 |
| 2012/0235029 | A1 * | 9/2012 | Tam | G01D 18/00 250/252.1 |
| 2012/0290257 | A1 * | 11/2012 | Hodge | G06F 1/3206 702/151 |
| 2013/0301046 | A1 * | 11/2013 | Lipson | G01J 1/32 356/326 |
| 2013/0324196 | A1 * | 12/2013 | Wang | H04W 52/0254 455/574 |
| 2014/0006830 | A1 * | 1/2014 | Kamhi | G06F 1/3287 713/324 |
| 2014/0073486 | A1 * | 3/2014 | Ahmed | A61B 5/02405 482/9 |
| 2014/0075230 | A1 * | 3/2014 | Suggs | H02J 7/35 713/323 |
| 2014/0078318 | A1 * | 3/2014 | Alameh | G06F 3/0304 348/207.99 |
| 2014/0267799 | A1 * | 9/2014 | Sadasivam | H04N 5/23216 348/207.99 |
| 2014/0368855 | A1 | 12/2014 | Yamano | |
| 2015/0077323 | A1 * | 3/2015 | Ramaswamy | G06F 3/012 345/156 |
| 2015/0154850 | A1 * | 6/2015 | Fadell | G06Q 10/083 340/501 |

OTHER PUBLICATIONS

Rachid M. Alameh, et al., "Portable Electronic Device with Dual, Diagonal Proximity Sensors and Mode Switching Functionality"; U.S. Appl. No. 14/595,261, filed Jan. 13, 2015, 35 pages.

Rachid M. Alameh, et al., "Adaptive Filtering for Presence Detection"; U.S. Appl. No. 14/620,257, Feb. 12, 2015, 27 pages.

Rachid M. Alameh, et al., "Portable Electronic Device with Proximity Sensors for Gesture Control and Contact Detection"; U.S. Appl. No. 14/619,263, filed Feb. 11, 2015, 44 pages.

Ballard, Tristan , "Search and Exam Report", Great Britain Application No. GB1600450.9; dated Jun. 28, 2016.

* cited by examiner

PORTABLE ELECTRONIC DEVICE WITH DUAL, DIAGONAL PROXIMITY SENSORS AND MODE SWITCHING FUNCTIONALITY

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. Electronic devices employ such proximity sensors to manage audio and video device output.

For example, when a device determines that a user's face is proximately located with the device, the device may reduce speaker volume so as not to over stimulate the user's eardrums. As another example, the proximity sensor may turn off the device display when the device is positioned near the user's ear to save power. Thus, these types of wireless communication device dynamically adjust the operation of audio and video output components when these components are positioned very close to, i.e., adjacent to, a user's ear. To work properly, the transmitter emitting the electromagnetic or electrostatic field in these proximity sensors draws power and must be continually operational, which can lead to reduced run time. It would be advantageous to have an improved proximity sensor systems and new uses for the same.

Figure 1:
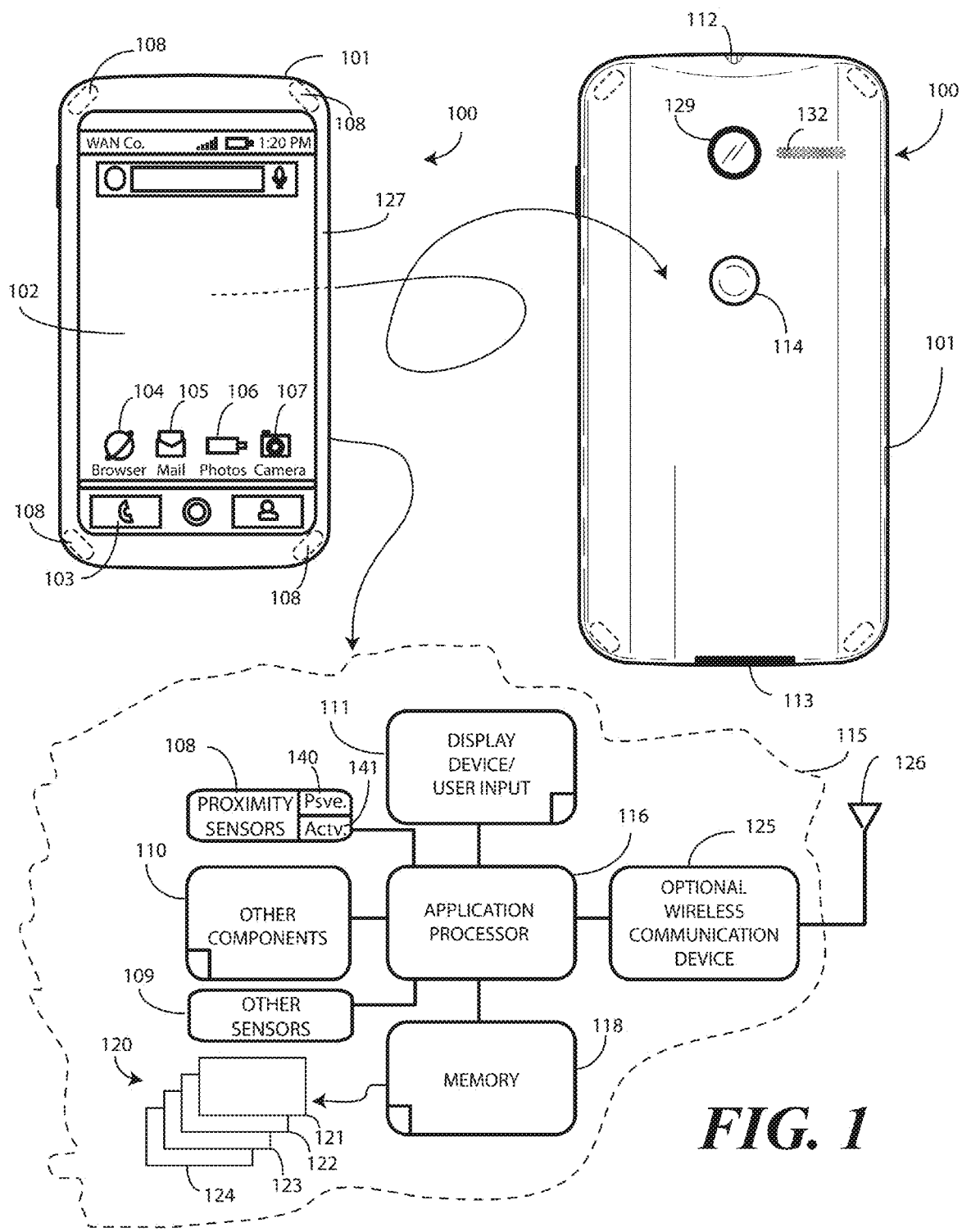
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors to control device operation as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. In some embodiments described below, the electronic device can also include one or more proximity detector components comprising transmitter-receiver pairs. However, as used herein, a proximity sensor component comprises a receiver only that does not include a corresponding transmitter.

Illustrating by example, in one embodiment the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component operating at shorter wavelengths of about 860 nanometers in one embodiment.

Accordingly, the one or more processors may be in a low power or sleep mode when no user is near the electronic device. During this time, the at least one proximity sensor component, which consumes very little power in one or more embodiments, can be active. When a user comes within reception range of the at least one proximity sensor component, infrared emissions from the user are detected by the at least one proximity sensor component. The one or more processors can then actuate at least one proximity detector component when the infrared signal receiver receives the infrared emission.

As noted above, in one or more embodiments the proximity sensor components comprise only signal receivers that receive infrared emission having wavelengths of between about four and ten micrometers. By contrast, as used herein proximity detector components include a signal receiver and a corresponding signal transmitter. While each proximity detector component can be any one of various types of proximity sensors, such as but not limited to, capacitive, magnetic, inductive, optical/photoelectric, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat emanating from a person's body while the proximity detector components rely upon reflections of infrared light emitted from the infrared signal transmitter. For example, the proximity sensor component may be able to detect a person's body heat from a distance of about ten feet or more, while the signal receiver of the proximity detector component may only be able to detect reflected signals from the transmitter at a distance of about one to two feet due to power considerations.

In one embodiment, the at least one proximity detector component can be actuated at a first sampling rate while the person is farther from the device. As the person moves closer, as determined by either the at least one proximity sensor component or the at least one proximity detector component, the at least one proximity detector component can be switched to a second, higher sampling rate. When operating at the second, higher sampling rate, the user can deliver user input to the device via the at least one proximity detector component to control the device in one or more embodiments.

In one or more embodiments, after actuating the at least one proximity detector component, the one or more processors can further actuate one or more user interface devices, such as the display, microphone, motion detector, audio output, and so forth. In one embodiment, these user interface devices can be actuated when the infrared signal receiver receives the infrared emission from the user. In another embodiment, these user interface components—which consume relatively large amounts of power compared to the proximity sensors—can be actuated only when the at least one proximity detector component receives reflected signals from the user at the first, lower sampling rate. In other embodiments, the user interface components can be actuated only when the at least one proximity detector component receives reflected signals from the user at the second, higher sampling rate to "wake" the device. In any of these scenarios, actuation of the user interface devices ensures the electronic device will be ready to use once the user reaches the device without requiring additional user operations to bring the device out of the low power or sleep mode.

A simple use case is helpful in demonstrating how one or more embodiments of the disclosure can be used. When a user is away from an electronic device and not within a detection range, components other than the proximity sensor component and its associated detection circuitry can be placed in a low power or sleep mode to conserve power. This includes any proximity detector components. In one or more embodiments, the proximity sensor component and its associated circuitry is the only sensor device that remains active to monitor a 360-degree coverage area across a range of about ten feet from the electronic device. In one embodiment, the proximity sensor component only consumes on the order of five microamps in this mode.

When a person comes within the detection radius of the device, the at least one proximity sensor component receives an infrared emission from the person's body heat. When this occurs, the at least one proximity sensor component can monitor the distance the user is from the electronic device by measuring the intensity of the received infrared emission. Once the person comes within a predefined distance of the electronic device, such as about six feet, the at least one proximity sensor component can actuate the at least one proximity detector component. In one embodiment, the initial actuation of the at least one proximity detector component occurs at a relatively low sampling rate, such as a few pulses per second.

Once the user gets within another, shorter, predetermined distance from the device, such as within about two feet, the at least one proximity sensor component can cause the at least one proximity detector component to operate at a second, higher sampling rate, such as about fifty pulses per second. In this mode of operation, the at least one proximity detector component can be used as a user interface device to control device operation. Specifically, a user can deliver user input to the device through the proximity detector components to control device operation.

Thus, using one or more embodiments of the disclosure, user presence can first be detected with the at least one proximity sensor component. When a user walks into a room, for example, and is still away from the electronic device, the at least one proximity sensor component can be the only active sensor of the electronic device. The at least one proximity sensor component can detect the user's presence by receiving infrared emissions from the person's body heat. When the user gets closer to the electronic device, the at least one proximity sensor component can trigger the at least one proximity detector component to turn ON at a first, low sampling rate such as a few pulses per second. The user can deliver, for example, touch input to the device when the at least one proximity detector component is operating at the first sampling rate. When the user gets very close to the device, such as within two feet, the at least one proximity sensor component can actuate the at least one proximity detector component at a second, higher sampling rate, such as fifty Hertz or more. The user can deliver gesture input to the at least one proximity detector component at the second sampling rate.

Once the at least one proximity detector component is operating at the second sampling rate, the one or more processors can then actuate one or more user interface devices. For example, in one embodiment a motion detector and a microphone can be actuated in anticipation of next actions the user may take, such as talking or touching the device following presence detection. Other operations will be readily obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 also include one or more proximity detector components 141. In one embodiment, the proximity sensor components 140 comprise only signal receivers. By contrast, the proximity detector components 141 include a signal receiver and a corresponding signal transmitter. It should be noted that each proximity sensor component 140 and proximity detector component 141 can be any one of various types of proximity sensors, such as but not limited to, capacitive, magnetic, inductive, optical/photoelectric, laser, acoustic/sonic, radar-based, Doppler-based, thermal, and radiation-based proximity sensors. Other types of sensors will be obvious to those of ordinary skill in the art.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few microamps. By contrast, a proximity detector component 141, which includes a signal transmitter to transmit signals for reflection off an object to a corresponding signal receiver, may draw hundreds of microamps to a few milliamps.

Figure 2:
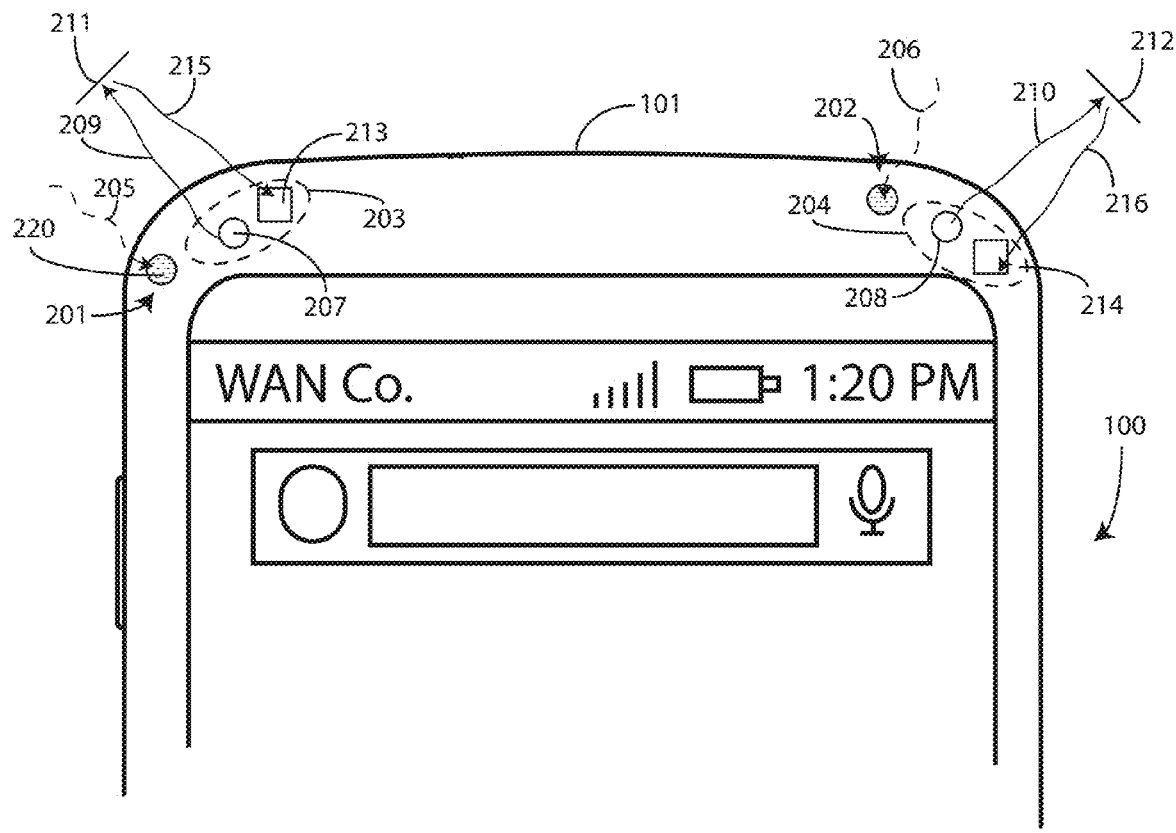
FIG. 2 illustrates explanatory proximity sensor component configurations in accordance with one or more embodiments of the disclosure.

Turning briefly to FIG. 2, illustrated therein are two proximity sensor components 201,202 and two proximity detector components 204, each disposed at a corner of the electronic device 100. In this embodiment, each proximity sensor component 201,202 comprises a signal receiver 220, such as an infrared photodiode to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive" proximity sensor.

By contrast, each proximity detector component 203,204 can be an infrared proximity sensor set that uses a signal emitter 207,208 that transmits a beam 209,210 of infrared light that reflects 211,212 from a nearby object and is received by a corresponding signal receiver 213,214. Proximity detector components 203,204 can be used, for example, to compute the distance to any nearby object from characteristics associated with the reflected signals 215,216. The reflected signals 215,216 are detected by the corresponding signal receiver 213,214, which may be an infrared photodiode used to detect reflected light emitting diode (LED) light, respond to modulated infrared signals, and/or perform triangulation of received infrared signals. The reflected signals 215,216 can also be used to receive user input from a user delivering touch or gesture input to the electronic device 100.

In one embodiment, the signal receivers of the proximity sensor components 201,202 and the signal receivers 213,214 of the proximity detector components 203,204 can be configured to receive different wavelengths so that reflected signals 215,216 can be distinguished from infrared emissions 205,206. Said differently, in one embodiment, an infrared signal receiver of a proximity sensor component 201,202 can receive the infrared emissions 205,206 at a first wavelength, while the signal receiver 213,214 of the proximity detector components 203,204 receive the reflected signals 215,216 at a second wavelength. In one embodiment, the second wavelength is shorter than the first wavelength. For example, the first wavelength may be between four and ten micrometers, while the second wavelength may be between 850 nanometers and one micrometer. These wavelengths are explanatory only, as others will be obvious to those of ordinary skill in the art having the benefit of this disclosure.

In one embodiment, the proximity sensor components 201,202 and the signal receivers 213,214 of the proximity detector components 203,204 can be configured to receive signals from different directions. For example, in one embodiment the proximity sensor components 201,202 can receive infrared emissions 205,206 along the perimeter of the electronic device 100. Said differently, in one embodiment the infrared emissions 205,206 are received by the proximity sensor components 201,202 when those infrared emissions 205,206 travel along a plane substantially parallel with the page of FIG. 2.

By contrast, in one or more embodiments the proximity detector components 203,204 can be configured to receive reflected signals 215,216 from a different direction. Illustrating by example, in one embodiment the proximity detector components 203,204 can be configured such that the reflected signals 215,216 are received from above the electronic device 100, e.g., orthogonal to the page of FIG. 2. The signal emitters 207,208 can be configured to transmit a beam 209,210 of infrared light orthogonally, i.e., upward and away from the page of FIG. 2, that reflects 211,212 from a nearby object disposed above or about the display. The reflected signal 215,216 travels downward into the page and is received by a corresponding signal receiver 213,214. Accordingly, in one or more embodiments the infrared emissions 205,206 are received at the edges of the electronic device 100 while the reflected signals 215,216 are received from above the electronic device 100. Please note that the thermal sensor receiver coverage angle can extend into the vertical even though it is shown parallel to the page in one or more embodiments, as openings in the housing can be designed to enable a ninety-degree reception angle.

Figure 3:
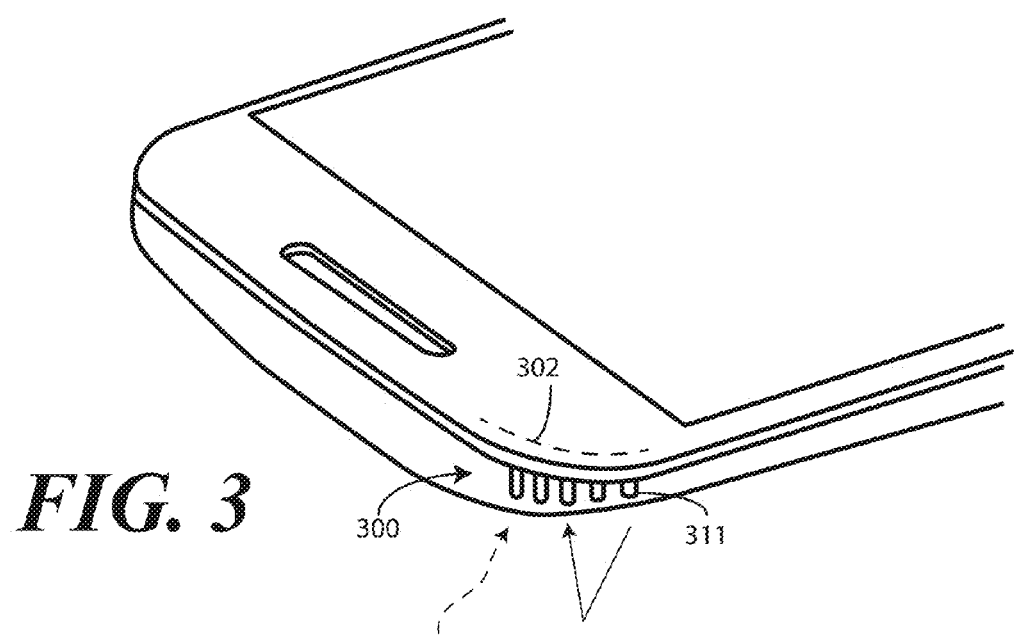
FIG. 3 illustrates one explanatory proximity sensor component configuration in accordance with one or more embodiment of the disclosure.

In one embodiment, the proximity sensor components 201,202 and the proximity detector components 203,204 can include at least two sets of components. For example, a first set of components can be disposed at a first corner of the electronic device 100, while another set of components can be disposed at a second corner of the electronic device 100. As shown in FIG. 3, when the components are disposed at a corner 300 of the electronic device, the components can be disposed behind a grille 301 that defines one or more apertures through which infrared emissions are received, for the proximity sensor components (201,202), and transmitted, for the proximity detector components (203,204).

In one embodiment, the grille 301 can define one or more reception beams in which infrared emissions can be received. The definition of such reception beams can enable the proximity sensor components (201,202) to detect motion by determining along which reception beams each emission is received. The proximity sensor components (201,202) can also detect changes across reception beams to detect motion as well.

The use of the grille 301 can also allow components to be collocated as well. For example, in one embodiment both a proximity sensor component (201) and a proximity detector component (203) can be disposed behind a common grille 301, with the one or more apertures being used to steer various reception and transmission beams. In one embodiment, each grille 301 can be associated with a lens 302 disposed behind the grille 301 to assist with the definition of the reception and transmission beams. For example, a polycarbonate lens 302 can be disposed behind the grille 301 and configured as a compound Fresnel lens with a predetermined number of slits, such as five or seven, to assist with the definition of the reception and transmission beams.

Figure 4:
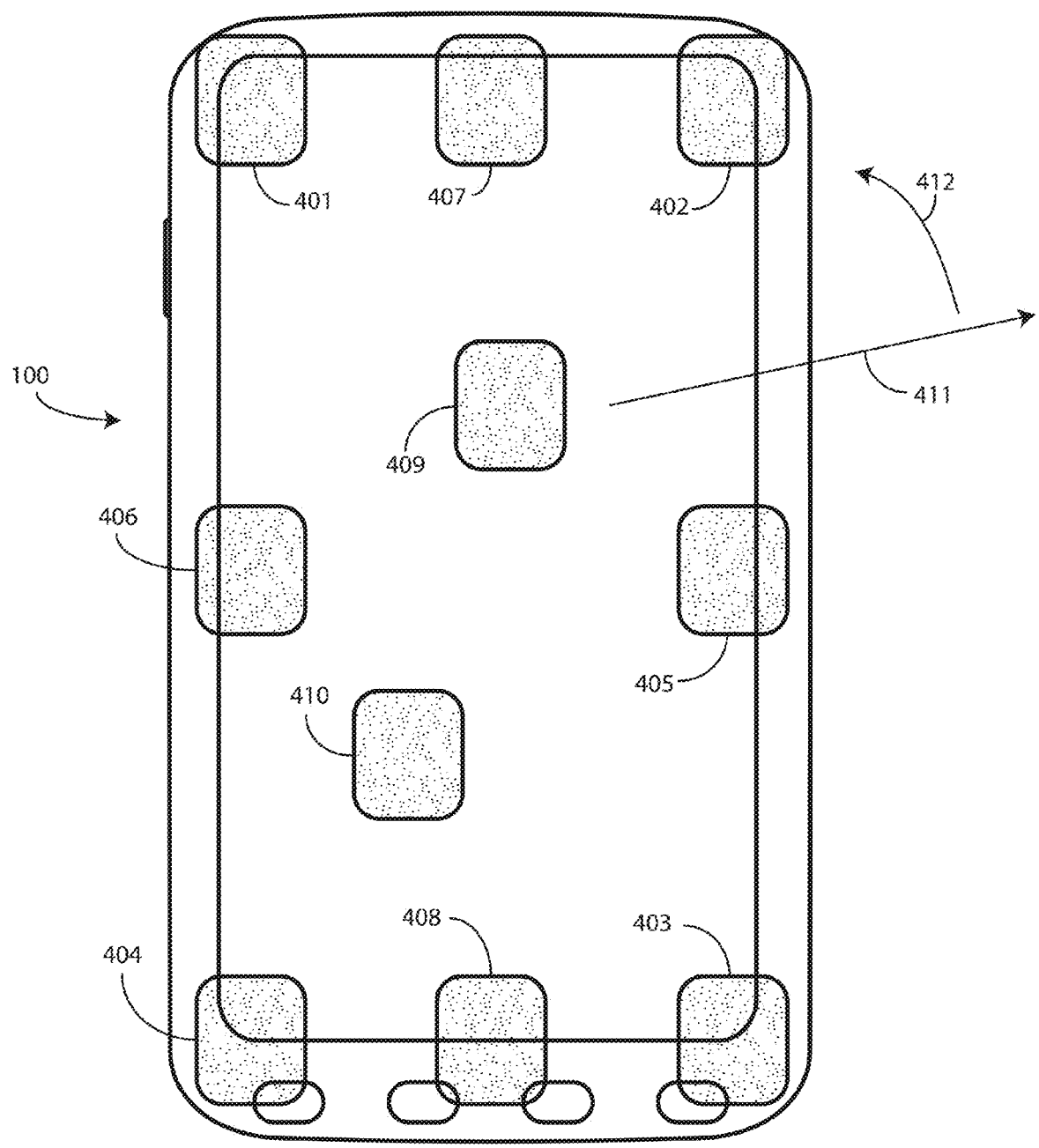
FIG. 4 illustrates explanatory locations along an electronic device where one or more proximity sensor components can be disposed in accordance with one or more embodiments of the disclosure.

It should be noted that corners 300 are not the only location at which proximity sensor and detector components can be located. Turning now to FIG. 4, illustrated therein are some of the many locations at which proximity sensor components and proximity detector components may be located. These locations include corner locations 401,402, 403,404, edge locations 405,406, end locations 407,408, major face locations 409, or ad hoc locations 410 based upon location. These locations can be used individually or in combination to achieve the desired detection radius 411 and radial detection sweep 412 about the electronic device 100. For example, some components can be disposed along the front major face of the electronic device 100, while other components are disposed on the rear major face of the electronic device 100, and so forth. Other locations and combinations will be obvious to those of ordinary skill in the art having the benefit of this disclosure.

Turning now back to FIG. 1, in one embodiment, the one or more processors 116 may generate commands based on information received from one or more proximity sensors 108. The one or more processors 116 may generate commands based upon information received from a combination of the one or more proximity sensors 108 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as accelerometers or gyroscopes. For example, an accelerometer may be embedded in the electronic circuitry of the electronic device 100 to show vertical orientation, constant tilt and/or whether the device is stationary.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the electronic device 100 can be operated in multiple modes of operation. A first mode, referred to herein as the "default" mode of operation, occurs where the electronic device 100 is not actively being used by a user. Instead, when in the default mode of operation, in one embodiment the one or more processors 116 can be placed in a low power or sleep mode while the one or more proximity sensor components 140 are active. In another embodiment, the one or more processors 116 cause at least the user interface and/or display to enter a low power or sleep mode when the infrared signal receiver of the one or more proximity sensor components 140 are not receiving the infrared emissions from external sources.

Once the one or more proximity sensor components 140 receive an infrared emission from an object external to the housing 101 of the electronic device 100, the one or more processors 116 of the electronic device 100 transition to an "active" mode of operation and are operable to actuate the proximity detector components 141 and optionally one or more user interface devices. In the active mode of operation, the one or more processors 116 are actively operating the proximity detector components 141 at one of a plurality of sampling rates.

Thus, illustrating by example, when a user is not using the electronic device 100, the one or more proximity detector components 141, the user interface, and components other than the proximity sensor components 140 may be in a sleep or low power mode in the default mode of operation. The one or more proximity sensor components 140 then actively monitor for the receipt of infrared emissions, which indicate that a user is within a reception radius of the one or more proximity sensor components 140. When infrared emissions are received from a source external to the housing 101 of the electronic device 100, the one or more processors 116 can detect this and can actuate the one or more proximity detector components 141 at a first sampling rate. Once the person gets sufficiently close to the electronic device, the one or more processors 116 can actuate the one or more proximity detector components 141 at a second, higher sampling rate in anticipation of the user's next action. Accordingly, the user arrives at a device ready to receive user input through the one or more proximity detector components rather than having to pick the device up, wake it from the default mode, and wait for all systems to boot.

This process is shown generally in FIGS. 5-9. Beginning with FIG. 5, the electronic device 100 is in the default mode of operation. Most components, including the display (102), the one or more proximity detector components (141), other sensors (109), and other components (110) are in a low power or sleep mode. However, the one or more proximity sensor components (140) are in their active mode waiting to receive infrared emissions from an object external to the housing (101) of the electronic device 100. Said differently, the one or more processors (116) operate at least the one or more proximity detector components (141) in a low power or sleep mode until the at least one proximity sensor component (140) receives an infrared emission from an object external to the housing (101).

Figure 5:
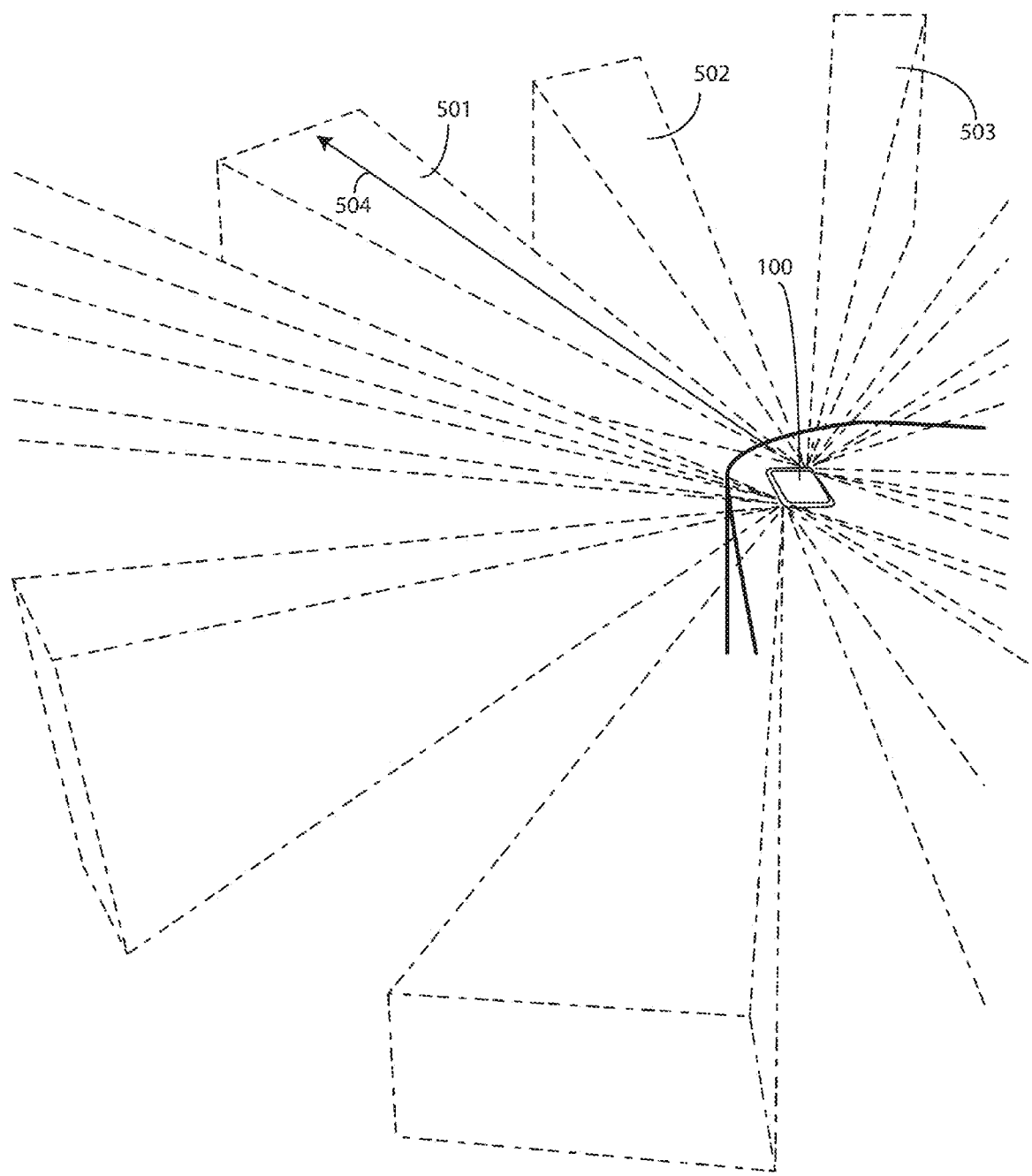
FIG. 5 illustrates an explanatory device having one or more proximity sensor components comprising infrared signal receivers in accordance with one or more embodiments of the disclosure.

As shown in FIG. 5, one or more signal reception beams 501,502,503 can be defined within which infrared emissions are received as previously described above with reference to FIG. 3. In this embodiment, the signal reception beams 501,502,503 define a 360-degree reception area about the device with a reception radius 504 of about ten feet. As no user is within the reception radius 504, power consumption within the electronic device 100 can remain extremely low.

Figure 6:
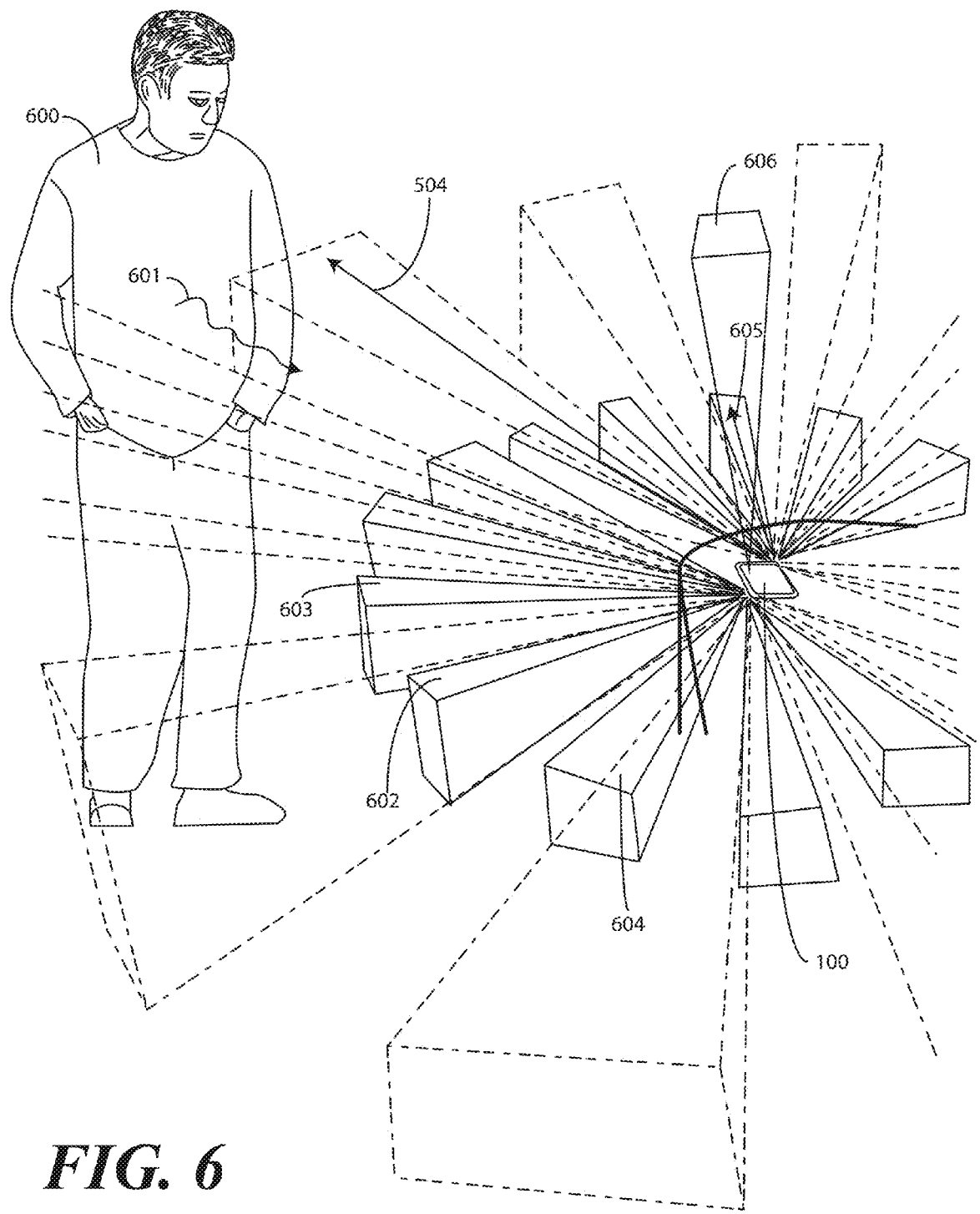
FIG. 6 illustrates the explanatory device of FIG. 5 receiving an infrared emission from an object external to the housing and executing one or more method steps, each in accordance with one or more embodiments of the disclosure.

Turning now to FIG. 6, a user 600 enters the reception radius 504. The user's body heat results in an infrared emission 601 being delivered to the one or more proximity sensor components (140) of the electronic device 100. When this occurs, in one embodiment the one or more processors (116) are operable to actuate the one or more proximity detector components (141). The one or more proximity detector components (141) generate one or more signal reflection beams 602,603,604 within which infrared reflections from the signal transmitter of the one or more proximity detector components (141) are received by the signal receivers of the one or more proximity detector components (141). In this embodiment, the signal reflection beams 602,603,604 define a 360-degree reception area about the device with a reflection radius 605 of about two feet. In one embodiment the reflection radius 605 of the one or more proximity detector components (141) is less than the reception radius 504 of the one or more proximity sensor components (140).

In another embodiment, as described above with reference to FIG. 2, the proximity sensor components (201,202) and the signal receivers (213,214) of the proximity detector components (203,204) can be configured to receive signals from different directions. For example, in one embodiment the proximity sensor components (201,202) can receive infrared emissions 601 from a perimeter of the electronic device 100, while the proximity detector components (203, 204) can be configured to receive reflected signals (215,216) from above the electronic device 100. Thus, while the one or more signal reflection beams 602,603,604 are shown about the electronic device 100 for convenience so as not to obscure the electronic device 100, they could be directed upward from the electronic device 100 as shown by reflection beam 606. In such an embodiment, the proximity sensor components (201,202) are configured for 360-degree edge detection of the user 600 at long range while the proximity detector components (203,204) are used for proximity detection and gesture control above the display.

Figure 7:
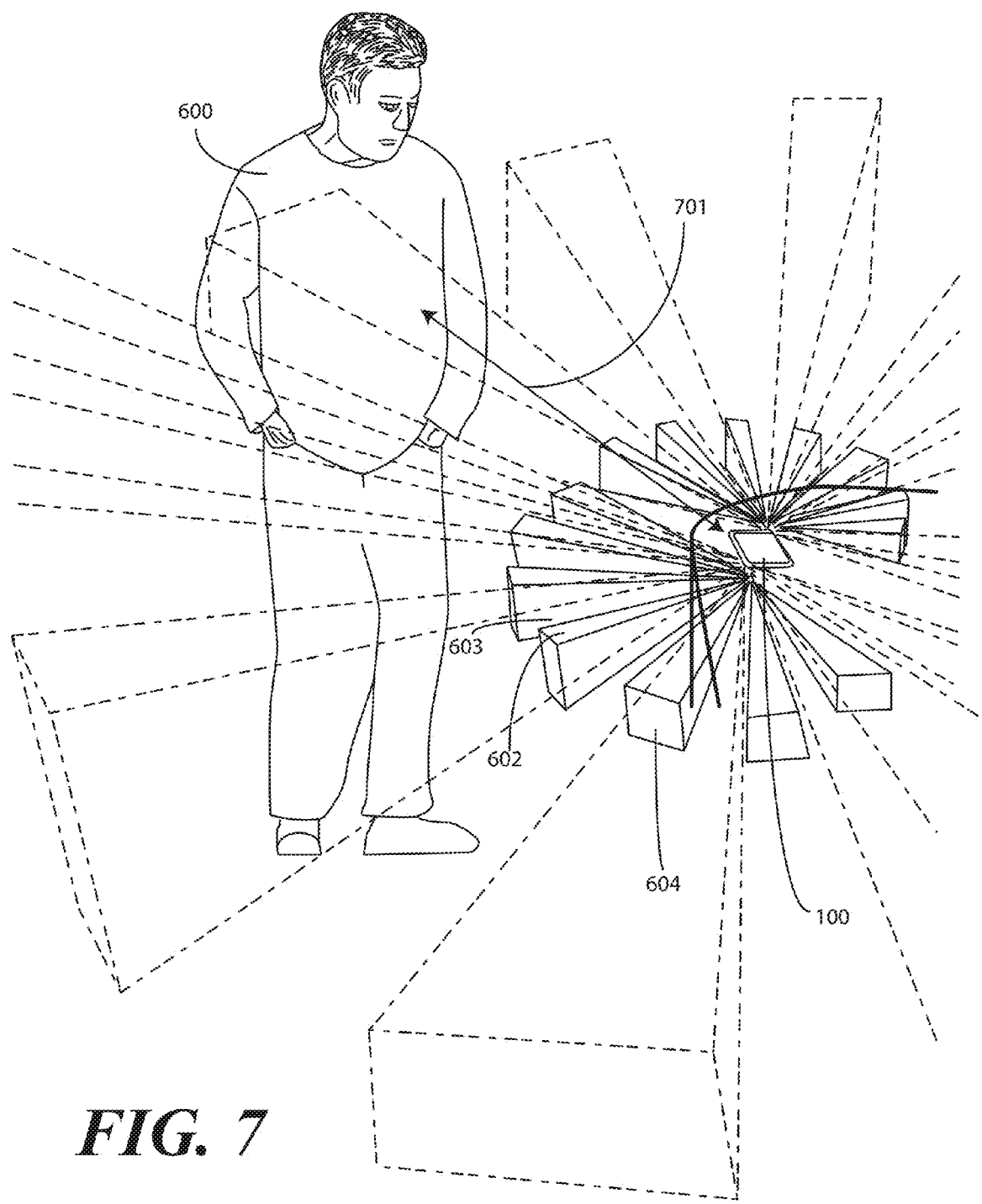
FIG. 7 illustrates the explanatory device of FIG. 5 receiving an infrared emission from an object external to the housing and executing one or more method steps, each in accordance with one or more embodiments of the disclosure.

In one embodiment, the one or more processors (116) actuate the one or more proximity detector components (141) as soon as the user 600 enters the reception radius 504 as shown in FIG. 6. In other embodiments, as shown in FIG. 7, the one or more processors (116) will not actuate the one or more proximity detector components (141) until the user 600 gets within a predetermined distance 701, such as six feet. In the latter case, the one or more proximity sensor components (140) can monitor the distance the user 600 is from the electronic device 100 and can cause actuation of the one or more proximity detector components (141) when the user is within the predetermined distance 701 to further conserve power within the electronic device 100.

In one embodiment, regardless of when the one or more proximity detector components (141) are actuated, the one or more processors (116) initially operate the one or more proximity detector components (141) at a first sampling rate when the at least one proximity sensor component (140)

receives the infrared emissions from the user 600. This first sampling rate is indicated in FIGS. 6-7 by the signal reflection beams 602,603,604 being shown in a 1-point line width. However, the one or more processors (116) can, with one or more of the proximity sensor components (140), or alternatively with one or more of the proximity detector components (141), monitor the user 600 to determine a distance of the user 600 from the housing (101) of the electronic device 100. The one or more processors (116) can transition the first sampling rate to a second sampling rate as a function of the determined distance. This is shown in FIG. 8.

Figure 8:
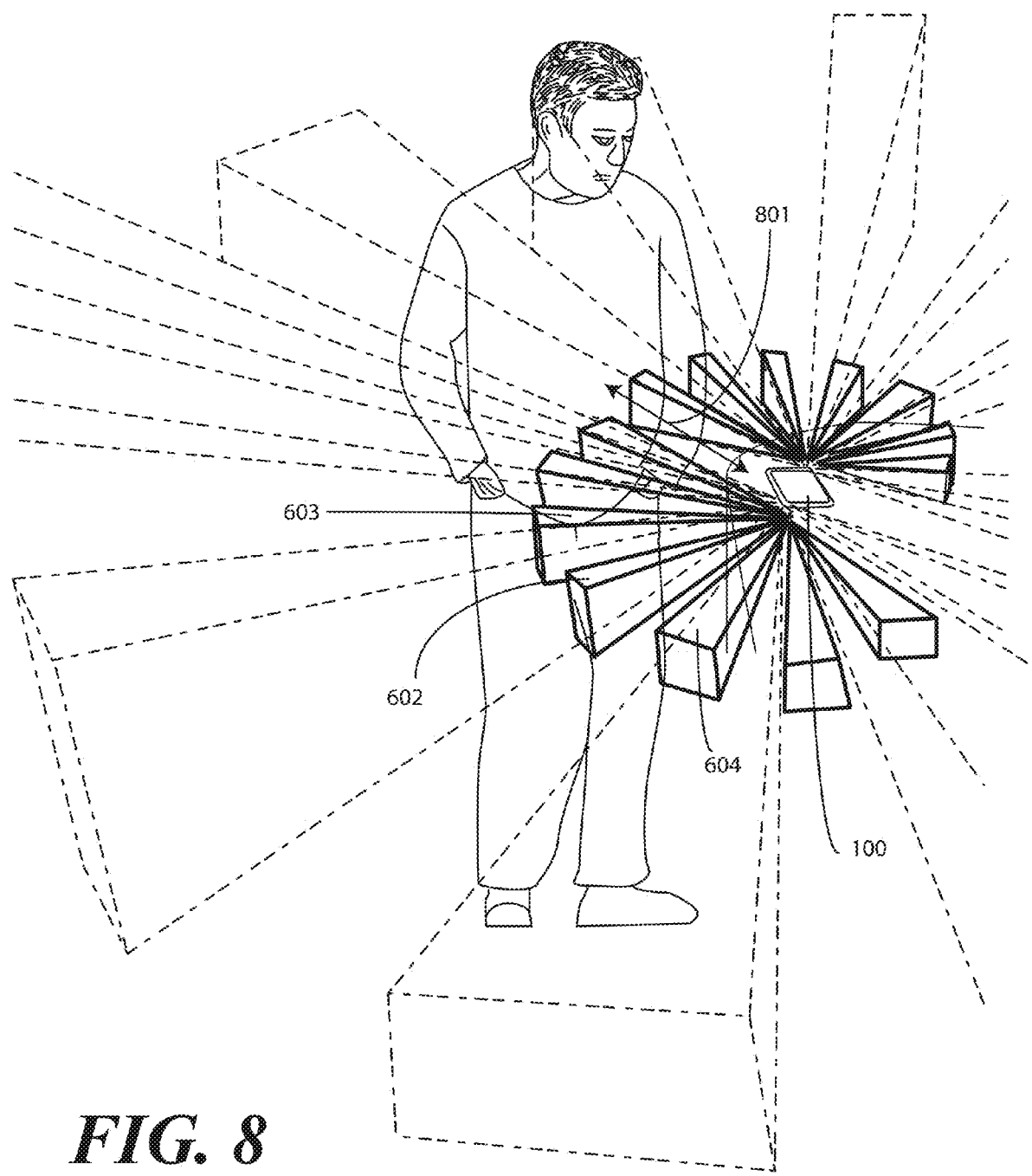
FIG. 8 illustrates the explanatory device of FIG. 5 receiving an infrared emission from an object external to the housing and executing one or more method steps, each in accordance with one or more embodiments of the disclosure.

Turning now to FIG. 8, the user 600 has come within a second predetermined distance 801 from the housing (101) of the electronic device 100. Accordingly, the one or more processors (116) now operate the at least one proximity detector component (141) at a second sampling rate when the distance is less than the predetermined threshold defined by the second predetermined distance 801. The second sampling rate is indicated in FIG. 8 by the signal reflection beams 602,603,604 being shown in a 2-point line width, which is thicker than the 1-point line width indicating the first sampling rate in FIGS. 6-7.

In one embodiment, the second predetermined distance 801 is about a foot or less. In one embodiment, the second sampling rate is higher that the first sampling rate. For example, the second sampling rate may be greater than or equal to twenty Hertz, while the first sampling rate is less than or equal to five Hertz. These sampling rates are explanatory only, as others will be obvious to those of ordinary skill in the art having the benefit of this disclosure.

In one or more embodiments, the one or more processors (116) can receive user input to control one or more functions of the electronic device 100 from signals received by the at least one proximity detector component (141) when operating at the second sampling rate. This is shown in FIG. 9.

Figure 9:
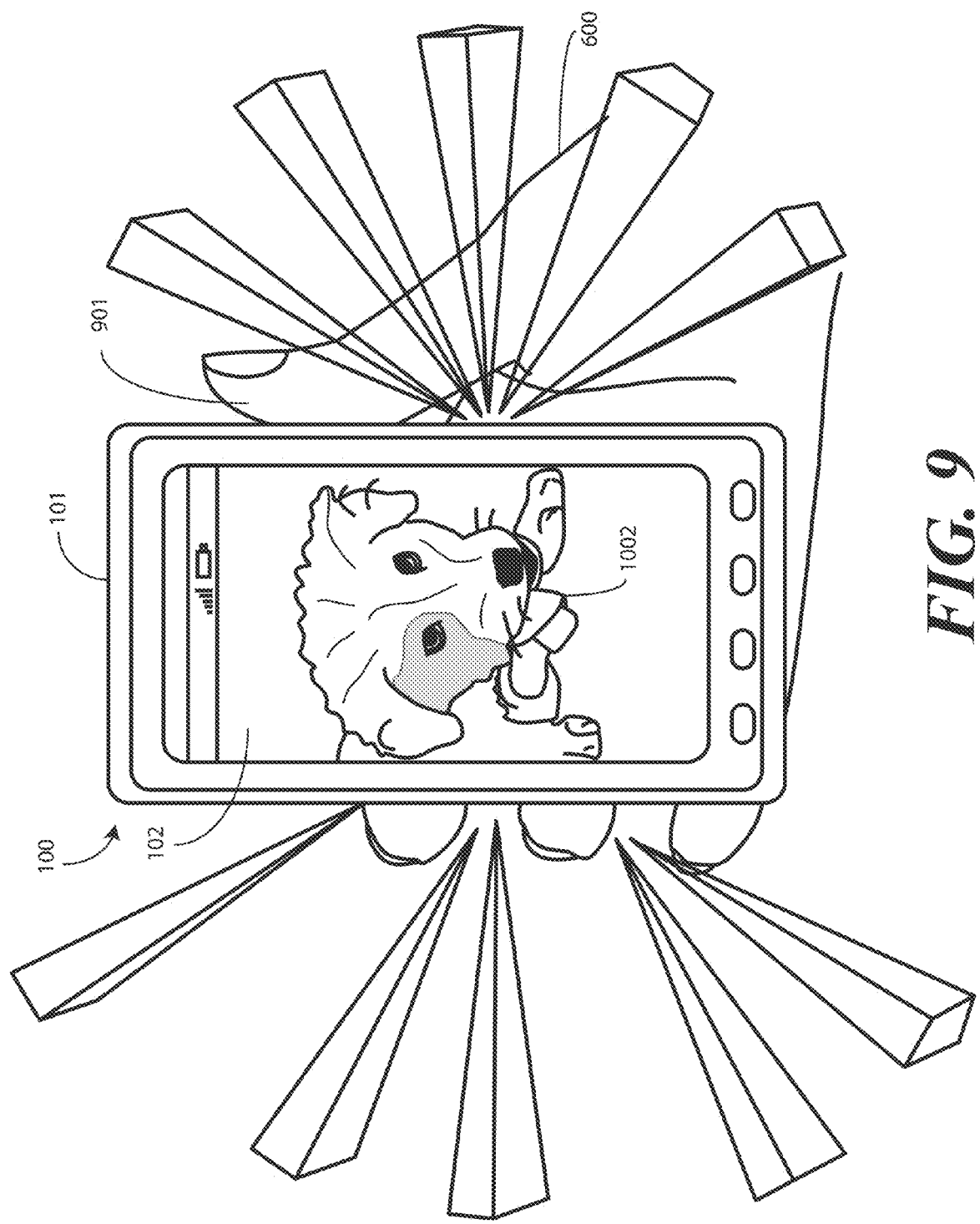
FIG. 9 illustrates an explanatory device in accordance with one or more embodiments of the disclosure receiving user input.

Turning now to FIG. 9, when the one or more proximity detector components (141) are in the active mode, infrared reflections received from the hand of the user 600 by the one or more proximity detector components (141) can be interpreted as user input. For example, the user 600 may slide his thumb 901 along the side of the electronic device 100, thereby causing infrared reflections from a transmitter to be delivered to a corresponding receiver. The reflections can be of differing intensities as the user's thumb 901 moves along the housing 101 of the electronic device 100. The one or more processors (116) of the electronic device 100 can interpret this as user input to, for example, scroll pictures 1002 along the display 102. Other examples of functions the user 600 can control by reflecting varying infrared emissions to the proximity detector components (141) include control of the volume of an audio output, control of the magnification of the image, control of the zoom level, and so forth. These are examples only, as other functions will be obvious to those of ordinary skill in the art having the benefit of this disclosure.

Figure 10:
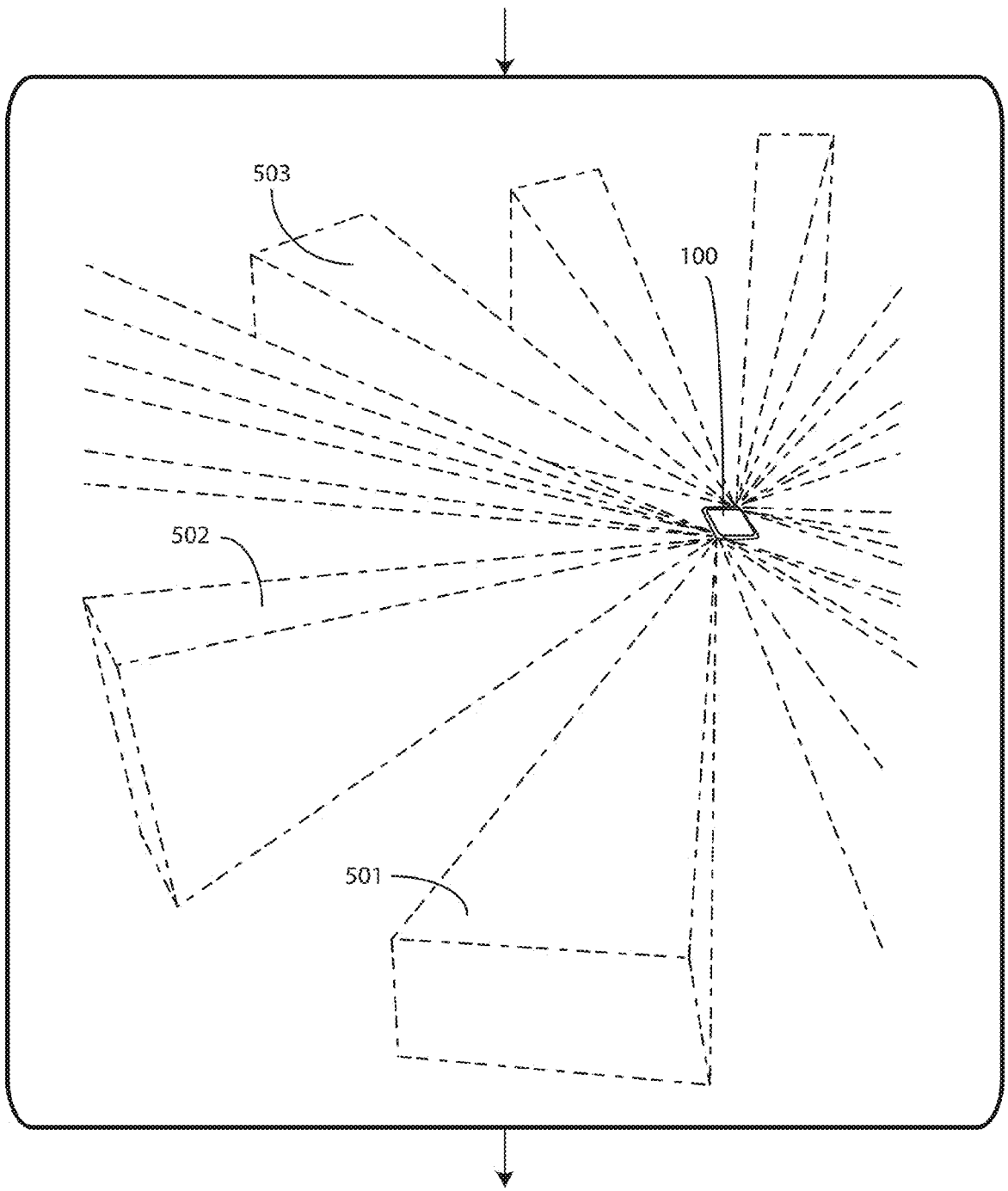
FIG. 10 illustrates one explanatory method step in accordance with one or more embodiments of the disclosure.
Figure 11:
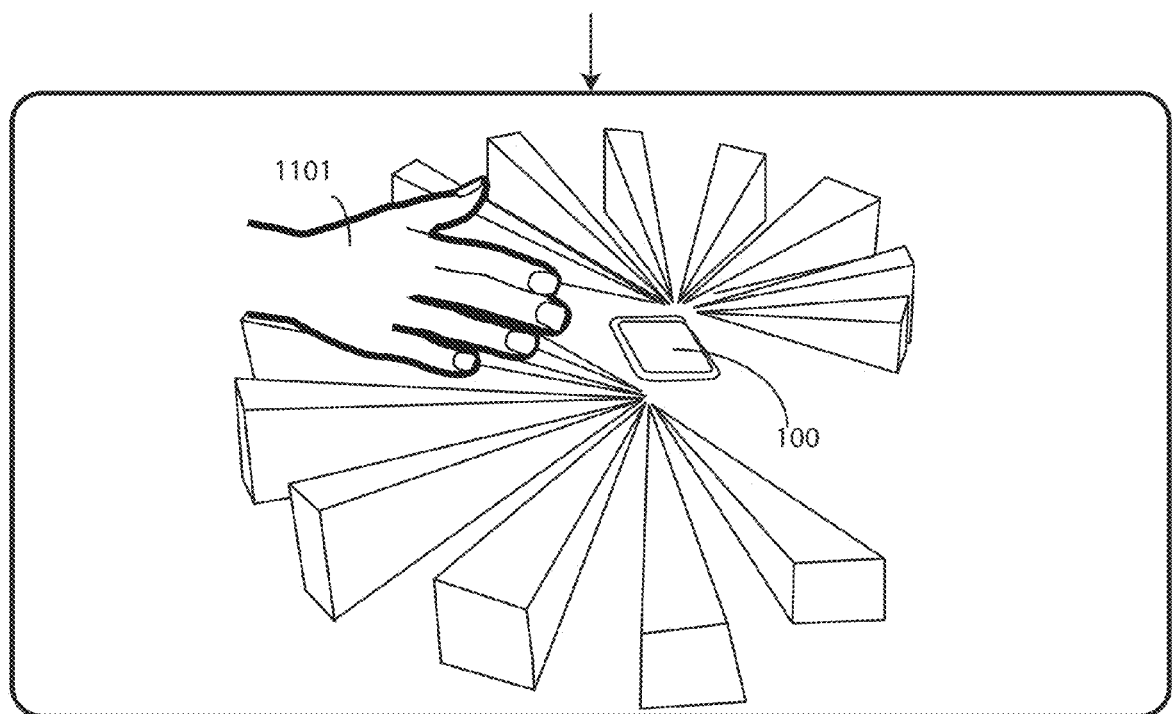
FIG. 11 illustrates another explanatory method step in accordance with one or more embodiments of the disclosure.
Figure 12:
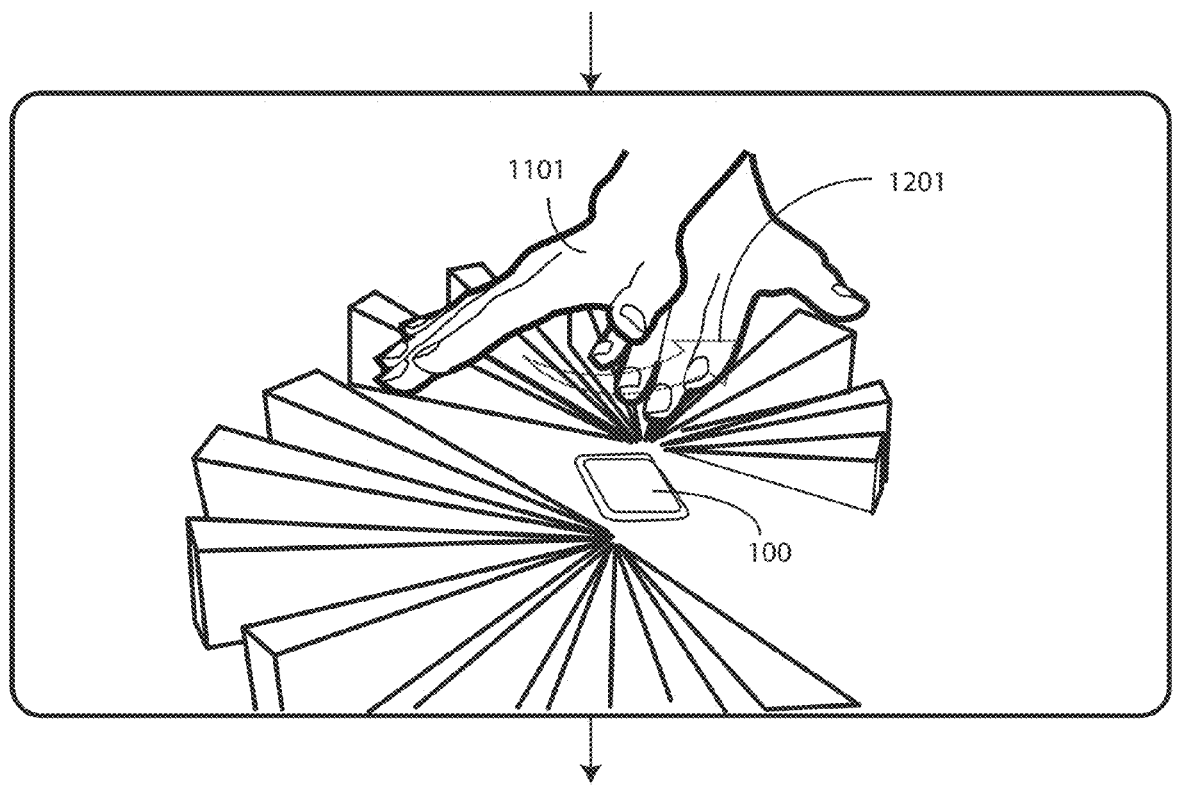
FIG. 12 illustrates another explanatory method step in accordance with one or more embodiments of the disclosure.

In one or more embodiments, the type of user input the electronic device 100 can receive can be a function of which proximity sensor (108) is active. This is shown in FIGS. 10-12. Beginning with FIG. 10, the one or more proximity sensor components (140) are active, while the one or more proximity detector components (141) are in a low power or sleep mode. Accordingly, the electronic device 100 can receive user detection input by detecting infrared emissions in the one or more signal reception beams 501,502,503.

In FIG. 11, the one or more proximity detector components (141) are operating at the first sampling rate. Since this rate is relatively low in one or more embodiments, resolution of user input actions is not as high as when the one or more proximity detector components (141) are operating at the second sampling rate. Accordingly, a user may be able to deliver, for example, simple input to the electronic device 100. Here, the user holds up a hand 1101 to provide, for example, a "display power ON" command to the electronic device 100.

By contrast, in FIG. 12, the one or more proximity detector components (141) are operating at the higher sampling rate. With the enhanced resolution motion of the user's hand 1101 can be detected. Accordingly, the user can deliver gesture input 1201 to the electronic device 100 to control device operations. If the user makes a complex gesture, the one or more processors (116) disposed within the electronic device 100 can be configured to detect one or more predefined characteristics of the gesture from the reflected signals received by the one or more proximity detector components (141) and can adjust how the electronic device 100 operates in response. For example, the one or more processors (116) can alter images on the display, output intensity, output color, and so forth.

Figure 13:
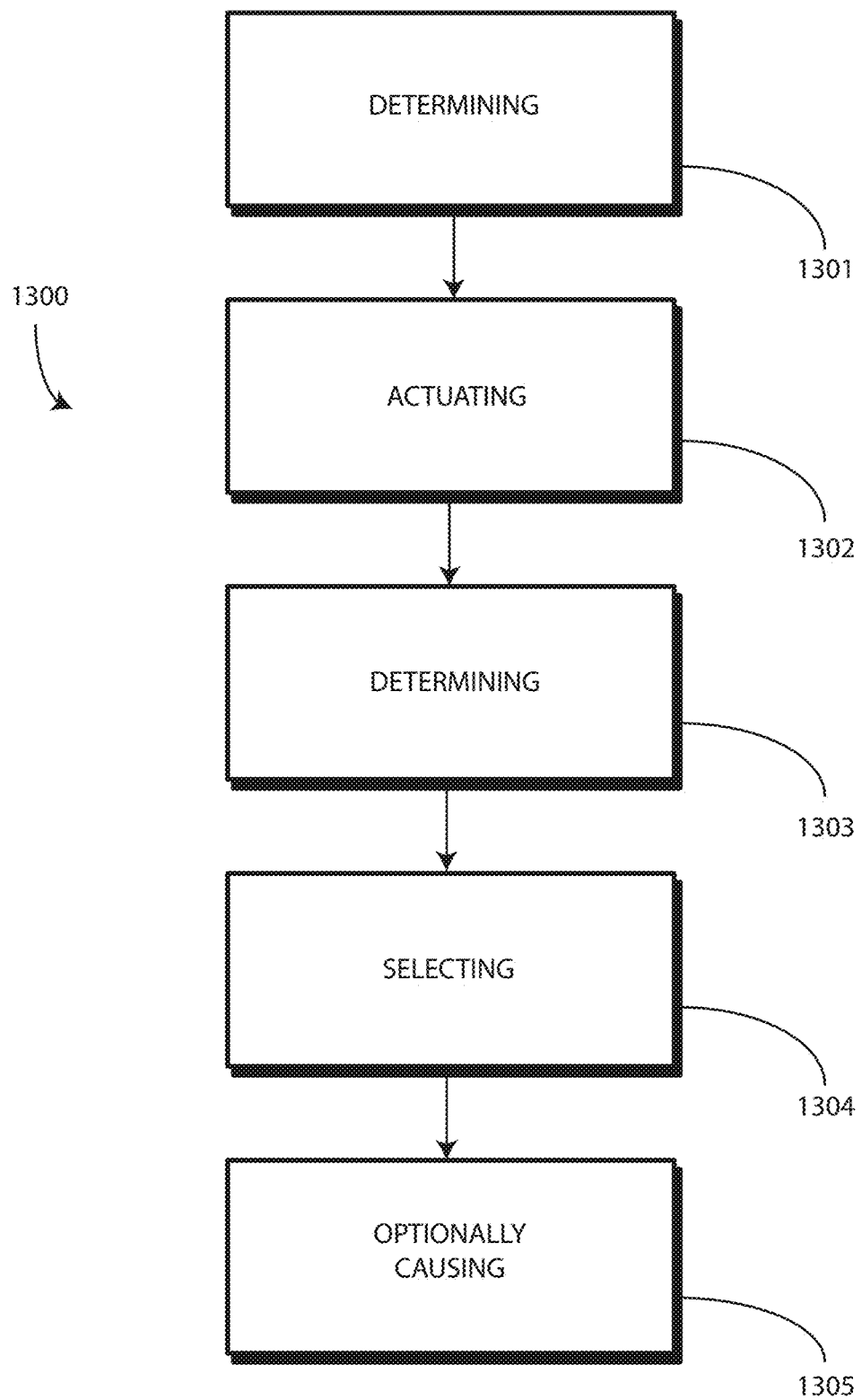
FIG. 13 illustrates an explanatory method in accordance with one or more embodiments of the disclosure.

Turning now to FIG. 13, illustrated therein is one explanatory method 1300 in accordance with one or more embodiments of the disclosure. At step 1301, the method includes determining, with at least one proximity sensor component comprising an infrared signal receiver to receive infrared emissions from objects external to a housing, a proximity of an object to a housing of the portable electronic device. At step 1302, and in response to detecting the proximity of the object, the method 1300 includes actuating at least one proximity detector component comprising a signal emitter and corresponding signal receiver.

At optional step 1303, the method 1300 includes determining a distance of the object to the housing. At optional step 1304, the method 1300 includes selecting a sampling rate of the corresponding signal receiver as a function of the distance. Step 1304 can include operating the corresponding signal receiver at a first sampling rate when the object is a first distance from the housing and operating the corresponding signal receiver at a second sampling rate when the object is a second distance from the housing. In one embodiment, the second distance is less than the first distance and the first sampling rate is less than the second sampling rate.

To save power in one or more embodiments, the at least one proximity detector component can be turned off when infrared emissions are not received within a predetermined time. For example, a timer can be started and when no infrared emissions are received while the timer is active, the at least one proximity detector component can be put into a low power or sleep mode to conserve power. Accordingly, at optional step 1305, the method includes causing the at least one proximity detector component to enter a low power or sleep mode when the at least one proximity sensor component fails to detect the proximity of the object.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
    a housing;
    one or more processors;
    at least one proximity sensor component operable with the one or more processors and comprising an infrared signal receiver to receive an infrared emission from an object external to the housing;
    at least one proximity detector component operable with the one or more processors and comprising a signal emitter and corresponding signal receiver;
    the one or more processors actuating the at least one proximity detector component when the at least one proximity sensor component receives the infrared emission from the object; and
    the one or more processors operating the at least one proximity detector component at a first sampling rate when the object is farther from the housing, and at a second sampling rate when the object is closer to the housing, where the second sampling rate is higher than the first sampling rate.

2. The electronic device of claim 1, the one or more processors operating the at least one proximity detector component in a low power or sleep mode until the at least one proximity sensor component receives the infrared emission from the object.

3. The electronic device of claim 1, the one or more processors operating the at least one proximity detector component at the first sampling rate when the at least one proximity sensor component receives the infrared emission from the object and the object is farther than a predetermined threshold from the housing.

4. The electronic device of claim 1, the one or more processors determining, with one or more of the at least one proximity sensor component or the at least one proximity detector component, a distance of the object from the housing.

5. The electronic device of claim 1, the one or more processors further transitioning the first sampling rate to the second sampling rate as a function of a distance the object is from the housing.

6. The electronic device of claim 3, the one or more processors operating the at least one proximity detector component at a second sampling rate when the object is less than the predetermined threshold from the housing.

7. The electronic device of claim 6, the predetermined threshold less than about one foot.

8. The electronic device of claim 6, the at least one proximity detector component further receiving gesture input at the second sampling rate.

9. The electronic device of claim 1, the first sampling rate less than five Hertz.

10. The electronic device of claim 1, the second sampling rate greater than twenty Hertz.

11. The electronic device of claim 1, the one or more processors to receive user input to control one or more functions of the electronic device from reflected signals received by the at least one proximity detector component at the second sampling rate.

12. The electronic device of claim 1, the signal emitter comprising an infrared signal emitter.

13. The electronic device of claim 1, the infrared signal receiver to receive the infrared emission at a first wavelength, the corresponding signal receiver to receive reflected signals at a second wavelength.

14. The electronic device of claim 13, the second wavelength shorter than the first wavelength.

15. A method in an electronic device, the method comprising:
    determining, with at least one proximity sensor component comprising an infrared signal receiver to receive an infrared emission from an object external to a housing, a proximity of the object to the housing; and
    in response to detecting the proximity of the object, actuating at least one proximity detector component comprising a signal emitter and corresponding signal receiver; and
    operating the corresponding signal receiver at a first sampling rate when the object is a first distance from the housing and at a second sampling rate when the object is a second distance from the housing;
    the second distance less than the first distance and the first sampling rate less than the second sampling rate.

16. The method of claim 15, the method further comprising determining a distance of the object to the housing.

17. The method of claim 16, further comprising selecting a sampling rate of the corresponding signal receiver as a function of the distance.

18. The method of claim 16, further comprising operating one or more processors in a low power or sleep mode until the at least one proximity sensor component receives the infrared emission from the object.

19. The method of claim 16, further comprising causing one or more of a user interface or display to enter a low power or sleep mode when the at least one proximity sensor component fails to detect the proximity of the object.

20. The method of claim 16, further comprising causing the at least one proximity detector component to enter a low power or sleep mode when the at least one proximity sensor component fails to detect the proximity of the object.

* * * * *